No. 829,743. PATENTED AUG. 28, 1906.
C. M. SOULE.
FISH SCALER.
APPLICATION FILED SEPT. 1, 1905.
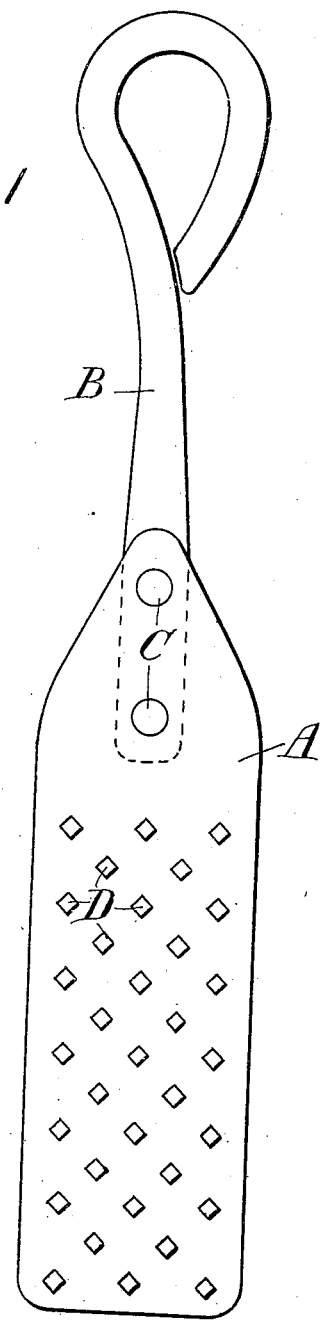
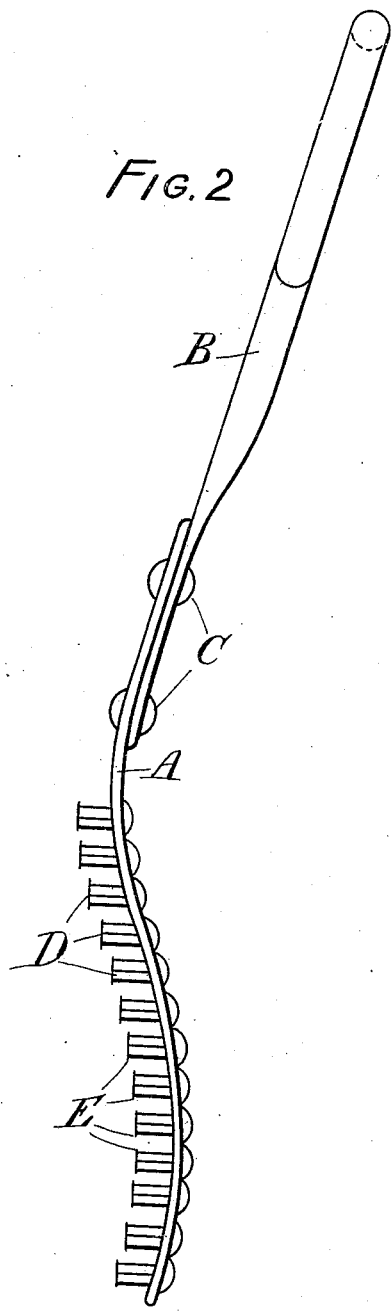
WITNESSES
INVENTOR
CHARLES M. SOULE.

UNITED STATES PATENT OFFICE.

CHARLES MERIDETH SOULE, OF GEELONG, VICTORIA, AUSTRALIA.

FISH-SCALER.

No. 829,743.      Specification of Letters Patent.      Patented Aug. 28, 1906.

Application filed September 1, 1905. Serial No. 276,704.

*To all whom it may concern:*

Be it known that I, CHARLES MERIDETH SOULE, a subject of the King of Great Britain, residing at Geelong, in the State of Victoria, in the Commonwealth of Australia, have invented certain new and useful Improvements in Fish-Scalers, of which the following is a specification.

My invention relates to an improved fish-scaler.

This invention relates to an improved appliance for removing the scales from fishes in an easier and more perfect manner than has hitherto been done.

It consists, mainly, of a metal strip curved slightly so as to conform approximately to the shape of the fish, having a handle either riveted on or forming an integral part of that strip or plate, which plate carries a number of studs or pins placed in staggered or diagonal rows. These studs may be of any suitable size or section, but preferably square or triangular in section and have their ends flattened and, if preferred, provided with a slightly-burred edge for catching under the scales and tearing them away from the skin of the fish.

In order that this invention may be properly understood, reference will now be made to the accompanying sheet of drawings, of which—

Figure 1 represents a front elevation of the scaler, and Fig. 2 a side elevation of the same.

To the plate A is attached the handle B, which in this case is riveted on at C. The studs D are of a square section and are riveted firmly onto the plate A in diagonal rows, their blunt ends being slightly hammered down, forming a bur E.

The operation is as follows: The fish being laid down flat on a table or board is grasped firmly with one hand, while with the other hand the scaler is moved up and down vigorously along the body of the fish, when in a very short time all the scales will be removed without injury to the fish.

Having now particularly described and ascertained the nature of my said invention and in what manner the same is to be performed, I declare that what I claim is—

In a fish-scaler the combination of a metal strip, a handle thereto and rows of projecting studs of an angular section having their ends burred over, all as described and for the purpose as specified.

Signed at Melbourne this 23d day of December, 1904.

CHARLES MERIDETH SOULE.

Witnesses:
   ROBERT T. HAINES,
   WILLIAM ALLAN.